P. F. DUNDON.
WOOD PRESERVING APPARATUS.
APPLICATION FILED JUNE 21, 1907.
952,887.
Patented Mar. 22, 1910.
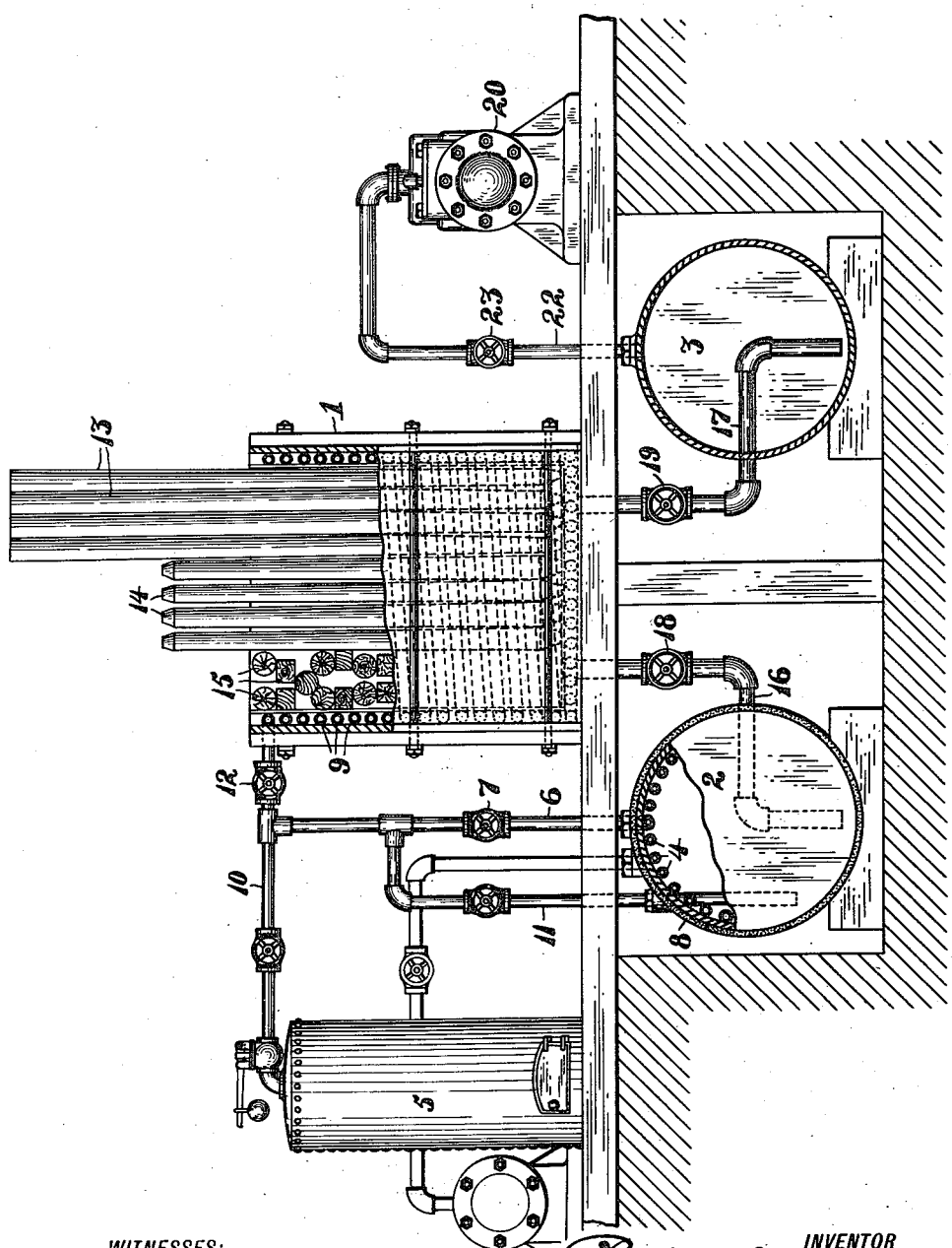
WITNESSES:
INVENTOR
BY
ATTORNEY

UNITED STATES PATENT OFFICE.

PATRICK F. DUNDON, OF SAN FRANCISCO, CALIFORNIA.

WOOD-PRESERVING APPARATUS.

952,887. Specification of Letters Patent. Patented Mar. 22, 1910.

Application filed June 21, 1907. Serial No. 380,097.

*To all whom it may concern:*

Be it known that I, PATRICK F. DUNDON, a citizen of the United States, residing at San Francisco, in the county of San Francisco and State of California, have invented certain new and useful Improvements in Wood-Preserving Apparatus, of which the following is a specification.

This invention relates to timber treating by such an apparatus that the inclosure of and direct pressure upon the wood to be treated are avoided.

It further relates to an improved apparatus for treating and preserving piles and like parts of wood work from decay and from the action of sea water and destructive insects therein.

My improvement consists in and means of saturating with preservative solutions, such as creosote, the parts of piles or wooden structures that are exposed to destruction or decay when immersed in water or buried in the earth, such apparatus consisting of simple devices as hereinafter described, to expose the parts of wood to a hot solution in an open tank or chamber and means to change from a hot to a cold solution while the wood is in a heated state and the sap and moisture therein is volatilized or greatly distended and the grain and pores of the wood are open and expanded.

The objects of my invention are to provide for the successful and effectual preservation treatment of timber in open vessels and secure penetration without the inclosure of the timber in close vessels and the application of direct pressure thereon, as is usual in such processes and by this means, not only avoid expensive and extensive apparatus but enable the preservative treatment to be confined to such portions only, of the timber as are to be immersed or buried and exposed to destruction or decay.

In carrying my invention into effect I employ an apparatus substantially as shown in the drawings which is a view in side elevation, partly in section.

As clearly shown in the drawings my apparatus consists of a main open top tank adapted to receive the material to be treated and two receivers mounted at a lower level than the main tank for receiving the treating solutions. Means are also provided for forcing the solutions from the receivers into the main tank and the solutions may be returned to the receivers either by gravity or other means all of which will be more fully hereinafter pointed out.

Referring to the drawing, 1, is the main or treating tank, of rectangular section, open at the top and large enough to contain charges of timber to be immersed, or in the case of poles or piles with depth enough so the contents will cover such parts to be exposed to decay or the active sea worms, or to be buried in the earth, the timber being set on end or laid on its sides according as whether it is desired to impregnate a part or the whole of the length of the sticks.

2 and 3 are receivers, preferably of metal and of circular sections, each made large enough to contain a quantity of the treating solution that will fill the main tank 1 to the required depth. These receivers 2 and 3 are maintained at different temperatures, the receiver 2 being provided with manifold heating pipes 4 around its interior connecting with the steam boiler 5 by means of a pipe 6 and valve 7. The interior of this receiver 2 is also in connection with the boiler 5 by means of a pipe 11 having a valve as shown. This admission of steam agitates the liquid solution and also assists in heating same. This receiver 2 is preferably covered with heat insulating material 8, to prevent radiation and with steam at high pressure from the boiler 5 can be raised to a high temperature to render the creosote limpid so that it will readily penetrate the wood. The receiver 3 is maintained at as low a temperature as possible, that of the surrounding air in the shade, being in most climates sufficient.

The main tank 1 is surrounded and its interior sides and bottom, by manifold heating pipes 9 connected to the boiler 5 by the pipe 10 and valve 12, a floor at the bottom protecting the pipes 9 from injury by the weight of the timber and solution when it is placed in the tank. The sides can also be protected from injury in like manner by fender bars or otherwise.

In the drawing 13 represents piles, 14, telegraph poles, and 15 miscellaneous timbers laid horizontally to be wholly immersed, as indicated, the vessel 1 being made deep enough to treat the piles and poles 13 and 14 to the required length.

The body of the main tank 1 is connected at the bottom with the receivers 2 and 3 by the large circulating pipes 16 and 17 through which its liquid contents can quickly flow by gravity down into the receivers 2 and 3 when the valves 18 or 19 are opened.

20 is an air compressing pump or engine of the usual construction connecting with the interior of the receiver 3 by means of a pipe 22 and valve 23.

The operation and process is as follows:—
The main tank 1 is charged with timber to be treated and the receivers 2 and 3 are filled with liquid solution. Steam from the boiler 5 is admitted to the manifold pipes 4 by the pipe 6 and valve 7 also is at the same time admitted to the body of the solution by the pipe 11 and valve and the solution is thereby forced from the receiver 2 through the pipe 16 into the tank 1, the valve 18 having been previously opened. When the solution in the receiver 2 has become thoroughly heated the valve 18 in the pipe leading to the main tank is opened and steam is admitted to the receiver through the pipe 11, thereby forcing the solution by means of the steam pressure from the receiver to the main tank. Hot steam is then admitted to the manifold pipe 9 in the tank 1 maintaining there a high temperature of the solution and the timber therein for some hours or until the timber is thoroughly heated, expanded and the pores open and the water from the timber evaporated. The steam is then shut off from the tank 1 and the receiver 2 and the hot solution in the tank 1 is allowed to run down the pipe 16 back into the receiver 2 aided if necessary by a vacuum produced in receiver 2 by means of the vacuum pump 21 connected to the receiver by a pipe 24, which has a valve 25 therein. The valve 19 is then opened and the cold contents of the receiver 3 are rapidly driven up the pipe 17 into the tank 1 by reason of air pressure developed in the receiver by the pump 20. This sudden change of the hot and cold solutions causes absorption and penetration of the latter without the usual pressure employed and the treatment is confined to exposed parts of the timber.

The relative levels of tanks and receivers may be changed and the filling and discharging operated either by pressure or vacuum as the circumstances may demand.

Having fully described my invention, what I claim as new and desire to secure by Letters Patent is—

1. In an apparatus for treating timber, the combination with a tank open at the top, two receivers, pipes leading from the tank to the receivers, the tank and one of said receivers having manifold heating pipes therein, of a steam boiler and an air pump, pipes leading from the steam boiler to the manifold heating pipes, a branch pipe for conducting steam direct into the receiver having the manifold heating pipes, a pipe leading from the air pump to the other receiver, the contents of the receivers adapted to be alternately introduced into the tank by means of pressure.

2. In an apparatus for treating timber, the combination with a tank, two receivers, pipes leading from the tank into the bottom of the receivers, of a steam boiler and an air pump, pipes connecting the steam boiler with one of the receivers, and pipes connecting the air pump with the top of the other receiver whereby the contents of the receivers may be forced into the tank.

3. In an apparatus for treating timber, the combination with a tank open at the top, two receivers, pipes leading from the bottom of the tank to the bottom of the receivers, the tank and one of said receivers having manifold heating pipes therein, of a steam boiler and an air pump, pipes leading from the steam boiler to the manifold heating pipes, a branch pipe for conducting steam directly into the receiver having the manifold heating pipes, and a pipe leading from the air pump to the other receivers, the contents of the receiver adapted to be alternately introduced into the tank by means of pressure.

4. The combination with a main tank, two receivers, pipes leading from the receivers to the main tank, valves in said pipes, the tank and one of said receivers having manifold heating pipes therein, of a steam boiler, pipes leading therefrom to the manifold heating pipes, a branch pipe for conducting the steam directly into the receiver which has the manifold heating pipes, valves in said steam pipes, and means for creating pressure in the other receiver.

In testimony whereof I have signed my name to this specification in the presence of two subscribing witnesses.

PATRICK F. DUNDON.

Witnesses:
A. M. HOLLAND,
THOMAS F. ECCLES.